United States Patent [19]

Yasuno

[11] Patent Number: 4,758,053
[45] Date of Patent: Jul. 19, 1988

[54] ANTI-SKID BRAKE CONTROL SYSTEM FOR AUTOMOTIVE VEHICLE WITH A FEATURE VARIABLE WHEEL SLIPPAGE THRESHOLD VARIABLE DEPENDING UPON VEHICULAR LATERAL FORCE

[75] Inventor: Yoshiki Yasuno, Yokohama, Japan

[73] Assignee: Nissan Motor Company, Limited, Yokohama, Japan

[21] Appl. No.: 849,729

[22] Filed: Apr. 9, 1986

[30] Foreign Application Priority Data

Apr. 9, 1985 [JP] Japan .................. 60-73605

[51] Int. Cl.⁴ .............................. B60T 8/00
[52] U.S. Cl. ...................... 303/91; 303/96; 303/100; 303/111
[58] Field of Search ............ 303/91, 94, 95, 96, 303/100, 105, 106, 108, 109, 110, 111

[56] References Cited

U.S. PATENT DOCUMENTS

| | | | |
|---|---|---|---|
| 3,637,264 | 1/1972 | Leiber et al. | 303/21 BE |
| 3,840,278 | 10/1974 | Fleischer et al. | 303/111 X |
| 3,910,647 | 10/1975 | Takeuchi | 303/100 |
| 4,349,876 | 9/1982 | Lindemann | 303/100 X |
| 4,384,330 | 5/1983 | Matsuda et al. | 364/426 |
| 4,392,202 | 7/1983 | Matsuda | 364/426 |
| 4,430,714 | 2/1984 | Matsuda et al. | 364/426 |
| 4,504,911 | 3/1985 | Braschel et al. | 303/96 X |
| 4,511,971 | 4/1985 | Dittner et al. | 303/110 X |
| 4,593,955 | 6/1986 | Leiber | 303/111 X |
| 4,640,557 | 2/1987 | Panizza et al. | 303/100 |

FOREIGN PATENT DOCUMENTS

| | | |
|---|---|---|
| 51-89096 | 8/1976 | Japan . |
| 56-75239 | 6/1981 | Japan . |
| 56-90754 | 7/1981 | Japan . |
| 0001061 | 1/1985 | Japan .................. 303/111 |
| 1383553 | 2/1975 | United Kingdom .............. 303/111 |

Primary Examiner—Duane A. Reger
Assistant Examiner—Matthew C. Graham
Attorney, Agent, or Firm—Foley & Lardner, Schwartz, Jeffery, Schwaab, Mack, Blumenthal & Evans

[57] ABSTRACT

An anti-skid brake control system for an automotive vehicle, is able to achieve both of satisfactory braking characteristics and cornering stability. The anti-skid brake control system is variable of wheel slippage criteria depending upon a magnitude of transverse force exerts on the vehicle for achieving both of the desired level of braking performance and sufficient cornering stability for suppressing undesirable vehicle behavior in transverse direction. Therefore, the an anti-skid brake control system, according to the present invention, controls application and release of an automotive brake system by comparing wheel speed with a wheel slippage criteria. The system is also detective of transverse force exerting on the vehicle body for varying the wheel slippage criteria so that wheel slippage criteria is set in a level assuring sufficient level of cornering force against the transverse force for satisfactory level of the cornering stability of the vehicle.

10 Claims, 9 Drawing Sheets

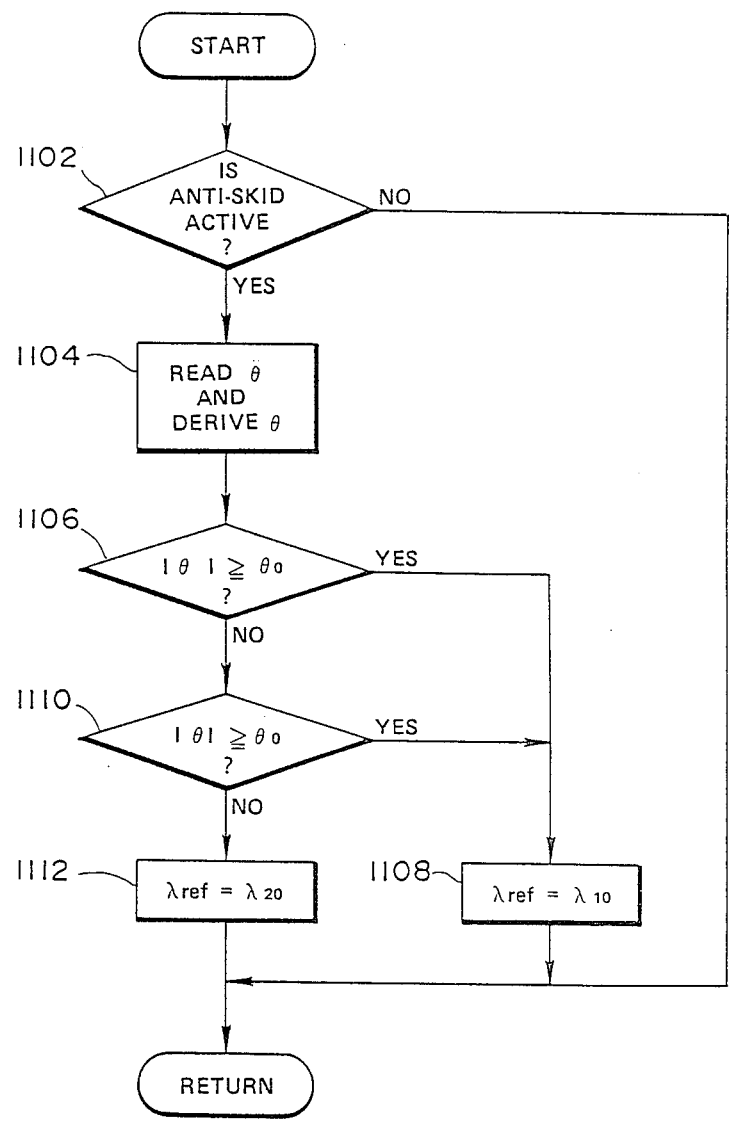

ANTI-SKID BRAKE CONTROL SYSTEM FOR AUTOMOTIVE VEHICLE WITH A FEATURE VARIABLE WHEEL SLIPPAGE THRESHOLD VARIABLE DEPENDING UPON VEHICULAR LATERAL FORCE

BACKGROUND OF THE INVENTION

The present invention relates generally to an anti-skid brake control system which can optimize braking characteristics. More particularly, the invention relates to an anti-skid brake control system featuring variable wheel slippage criteria for releasing braking force depending upon lateral force exerted on the vehicle. Further specifically, the invention relates to a process for performing anti-skid automotive brake control optimizing not only the vehicular braking characteristics but also the vehicle cornering stability.

As is well known, optimum braking characteristics are obtained when braking pressure or force can be so adjusted that the peripheral speed of the wheels during braking is held to a given ratio, e.g. about 80% to 85%, of the vehicle speed. This practice is believed to be particularly effective when road conditions and other factors are taken into consideration. On the other hand, if wheel speed is held to a ratio to the vehicle speed higher than the above-mentioned optimal ratio, e.g., 80% to 85%, braking distance may be prolonged due to lack of braking pressure.

On the other hand, if the braking pressure is so adjusted as to hold the wheel speed to a ratio with respect the vehicle speed less than the aforementioned optimal ratio, the vehicle wheels may lock and skid, resulting in an unnecessarily long braking distance due to reduced traction. In practice, it is very difficult to precisely adjust the braking pressure so that the wheel speed is held to the given optimal ratio to the vehicle speed.

In the practical anti-skid brake control operation, braking pressure in one or more wheel cylinders is adjusted by cyclically increasing and decreasing the braking pressure in the wheel cylinder.

The anti-skid control system generally decreases braking pressure when the wheel deceleration value becomes less than a given deceleration threshold, which is so chosen as to prevent the wheel from skidding, and increases braking pressure when the wheel acceleration value is greater than a given acceleration threshold. In this conventional anti-skid brake control procedure, wheel speed does not remain in an optimal relationship to the vehicle speed for a satisfactorily long period of time. In order to improve performance, U.S. Pat. No. 3,637,264, issued on Jan. 25, 1972 to Leiber et al discloses an Antilocking Control for Pressure Actuated Brakes. The pressure of the brake-actuating fluid in an antilocking brake control system is varied by pulsing the control valve or valves for durations which are varied to be greater or lesser than the period of that limiting frequency above which the brake system cannot respond.

In the former case, a rapid increase in fluid pressure or a rapid decrease in fluid pressure occurs, whereas in the latter case, a less rapid average or net increase or decrease occurs in the fluid pressure to which the brake system responds. These conditions are controlled in dependence on the rotational behavior of the vehicle wheel or wheels and more especially in dependence or predetermined changes in angular velocity of the wheel.

Moreover, either variation in pulse duration at a fixed frequency or variation in frequency at a fixed pulse duration may be effected during high-frequency pulsing so as further to alter the net increase or decrease in fluid pressure. This further alternation is effected as a function of time from the beginning of the high-frequency pulsing.

In addition, Published Japanese Patent Application (Tokkai) Showa No. 51-89096, published on Aug. 4, 1976 discloses a system similar to the above. The fluid pressure in the wheel cylinder is increased in a stepwise manner. Duration of increase of the fluid pressure is adjusted in accordance with the rate of increase of the fluid pressure in one or more preceding steps.

In addition, a vehicular cornering force tends to decrease as wheel slippage increases. Therefore, when the anti-skid control is active to maintain the wheel slippage at the optimal level, i.e. 10 to 20%, cornering force of the vehicle tends to be reduced than when there is no wheel slippage condition. This result in unstability of the vehicle behavious with respect to the transverse force possibly exerts the vehicle during cornering. Therefore, it has been conventionally considered that it is not possible to achieve both of satisfactory level of bracking characteristics and sufficient cornering stability.

SUMMARY OF THE INVENTION

Therefore, it is an object of the present invention to provide an anti-skid brake control system for an automotive vehicle, which is able to achive both of satisfactory braking characteristics and cornering stability.

Another object of the invention is to provide an anti-skid brake control system which is variable of wheel slippage criteria depending upon a magnitude of transverse or lateral force exerted on the vehicle for achiving both the desired level of braking performance and sufficient cornering stability for suppressing undesirable lateral vehicle movement.

In order to accomplish the aforementioned and other objects, an anti-skid brake control system, according to the present invention, controls application and release of an automotive brake system by comparing wheel speed with a wheel slippage criteria. The system is also detective of transverse force exerting on the vehicle body for varying the wheel slippage criteria so that wheel slippage criteria is set in a level assuring sufficient level of cornering force against the transverse force for satisfactory level of the cornering stability of the vehicle.

According to one aspect of the invention, an anti-skid brake control system for an automotive vehicle comrises a hydraulic brake circuit for building up braking fluid pressure according to manual braking operation and distributing fluid pressure to at least one wheel cylinders, a pressure control valve unit disposed within the hydraulic brake circuit for varying valve positions between a first position in which fluid pressure in the wheel cylinder is increased according to increasing of the braking pressure built up in the hydraulic brake circuit, and a second position in which the fluid pressure in the wheel cylinder is decreased, a first sensor for producing a wheel speed indicative signal representative of a rotation speed of a vehicular wheel, a second sensor for producing a lateral force indicative signal representative of a lateral force applied to a vehicle body, a controller receiving the wheel speed indicative signal for deriving the control signal for operating the pressure control valve unit between the first and second positions, the controller deriving a wheel slippage based on the wheel speed and comparing derived wheel slippage with a given reference value so as to operate the pressure control valve to the second position when the derived wheel slippage is greater than the given reference value, and the controller being responsive to the lateral force indicative signal having a value exceeding a given threshold for decreasing the given reference value at a predetermined value.

In the preferred embodiment, the second sensor comprises a steering angle sensor for monitoring steering angular variation and producing a steering angle indicative signal serving as the lateral force indicative signal.

In the alternative embodiment, the second sensor comprises a yaw rate sensor for monitoring magnitude of yawing motion of the vehicle and producing a yawing rate indicative signal serving as the lateral force indicative signal.

According to another aspect of the invention, an anti-skid brake control system for an automotive brake system comprises a hydraulic brake system including a wheel cylinder for applying braking pressure to a vehicle wheel, and a pressure control valve associated with the wheel cylinder for adjusting fluid pressure in the wheel cylinder, the pressure control valve being operative to increase fluid pressure in the wheel cylinder in a first position, to decrease fluid pressure in the wheel cylinder in a second position and to hold fluid pressure in the wheel cylinder constant in a third position, a wheel speed sensor detecting rotation speed of the wheel and producing a wheel speed indicative signal having a value indicative of the detected wheel speed, a lateral force sensor for producing a lateral force indicative signal representative of a lateral force applied to a vehicle body, and a controller deriving a control signal for controlling operation of the pressure control valve to actuate the latter to one of the first, second and third position on the basis of the wheel speed indicative signal so as to control the wheel speed at a given optimal relationship to vehicle speed, the controller deriving a wheel slippage based on the wheel speed and comparing derived wheel slippage with a given reference value so as to operate the pressure control valve to the second position when the derived wheel slippage is greater than the given reference value, and the controller being responsive to the lateral force indicative signal having a value exceeding a given threshold for decreasing the given reference value at a predetermined value.

In the preferred anti-skid control operation, the controller is operative to derive brake control parameters including a wheel acceleration and the wheel slippage and to derive the control signal according to the predetermined schedule in which:

the pressure control valve is actuated to the third position when the derived wheel deceleration is greater than a given deceleration threshold, in a hold mode of the controller;

the pressure control valve is actuated to the second position when the derived slip rate is greater than a given slip rate threshold, in a release mode of the controller;

the pressure control valve is actuated to the third position when the slip rate is less than the slip rate threshold, in a hold mode of the controller; and the pressure control valve is actuated to the first position when the derived wheel acceleration is greater than a given acceleration threshold, to the third position when the fluid pressure, increased due to the pressure control valve being in the first position, reaches a given pressure slightly below the lock pressure, and to the first position after expiration of the given period, in an application mode of the controller.

BRIEF DESCRIPTION OF THE DRAWINGS

In the drawings:

FIG. 12 is a flowchart for setting a wheel slippage threshold depending upon steering angular position;

DESCRIPTION OF THE PREFERRED EMBODIMENT

Figure 1A:
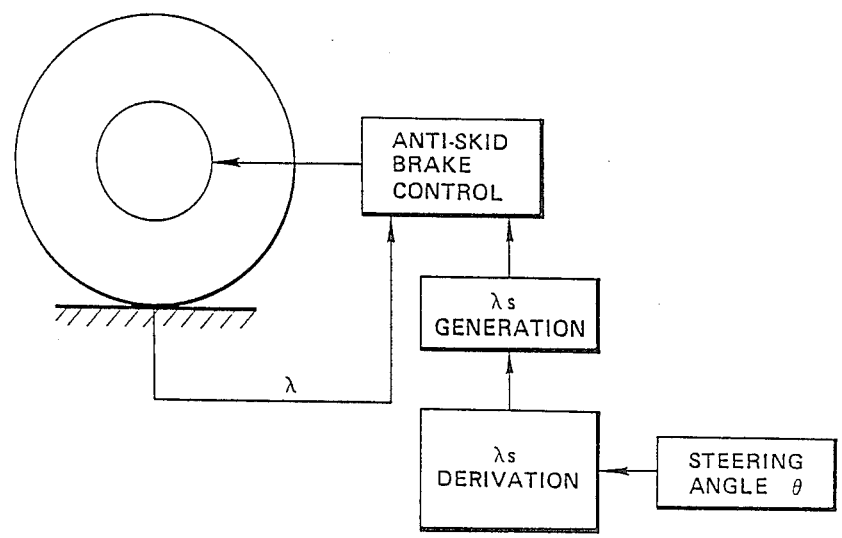
FIGS. 1(A) and 1(B) are explanatory illustration of the general construction of the preferred embodiments of an anti-skid brake control system according to the present invention.

Referring now to the drawings, particularly to FIG. 1(A), an anti-skid brake control system generally controls hydraulic pressure to be applied for wheel cylinders associated with vehicular wheels. In general, the anti-skid brake control system monitors wheel speed for deriving a wheel slippage $\lambda$ while the hydraulic pressure is applied to the wheel cylinder. The derived wheel slippage is compared with a given wheel slippage threshold $\lambda_s$. In the control process, the hydraulic pressure is increased as long as the wheel slippage $\lambda$ is remains below the given wheel slippage threshold $\lambda_s$. On the other hand, when the wheel slippage $\lambda$ reaches the given wheel slippage threshold $\lambda_s$ or exceeds the latter, the hydraulic pressure is decreased until the wheel slippage λ drops below the wheel slippage threshold.

According to the present invention, the given wheel slippage threshold $\lambda_s$ is variable depending upon vehicular steering behaviour. For monitoring the vehicular steering behaviour, a steering condition sensor is provided. The steering condition sensor is associated with a wheel slippage threshold $\lambda_s$ deriving means. The wheel slippage threshold deriving means is responsive to the output of the steering condition sensor for varying the wheel slippage threshold depending upon the magnitude θ of steering angular position.

In the preferred process, the wheel slippage threshold $\lambda_s$ is decreased as increasing of the steering angular displacement θ from the neutral position.

Figure 1B:
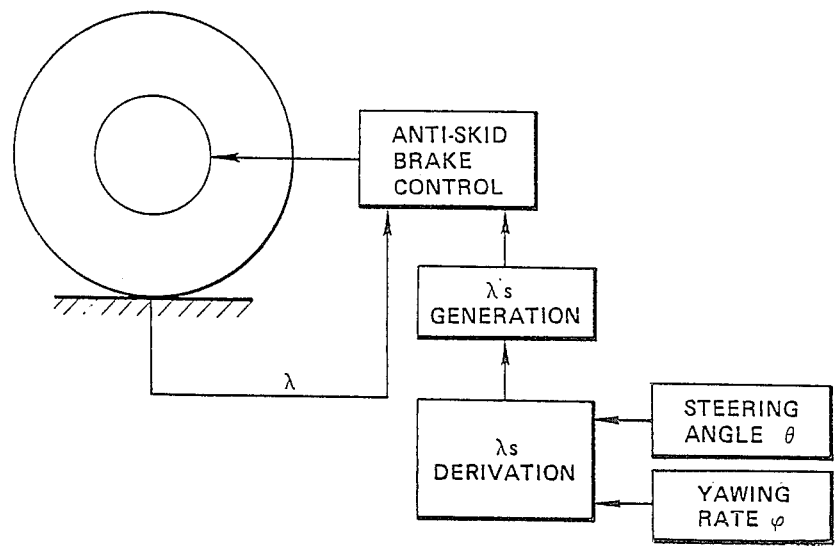

In FIG. 1(B), a vehicular yawing rate sensor is added to the system of FIG. 1(A). The yawing rate sensor monitors yawing of the vehicle. The output of the yawing rate sensor is also fed to the wheel slippage threshold $\lambda_s$ deriving means together with the output of the steering condition sensor.

The wheel slippage threshold deriving means is responsive to the outputs of the steering condition sensor and the yawing rate sensor for varying the wheel slippage threshold $\lambda_s$ depending upon the steering angular position θ and the yawing rate of the vehicle.

By adjusting the wheel slippage threshold which is representative of the braking pressure releasing point depending upon the steering condition and/or yawing rate, which reflect transverse force exert on the vehicle, balance of the vehicular braking performance and the steering stability can be achieved at higher level.

The preferred embodiment of the anti-skid brake control system, according to the present invention will be described herebelow with reference to FIGS. 2 to 14.

Figure 2:
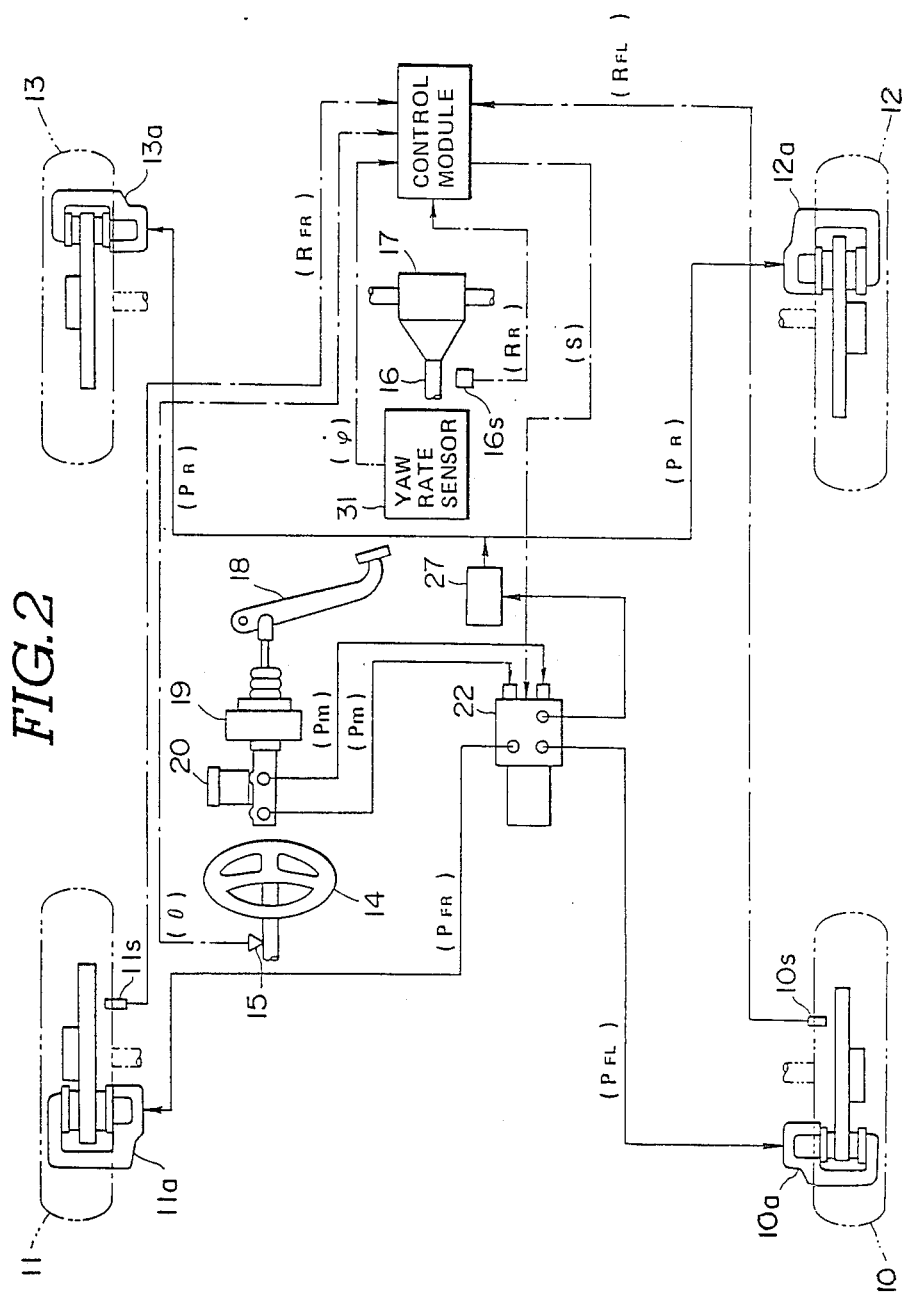
FIG. 2 is a schematic diagram showing the preferred embodiment of an anti-skid brake control system according to the invention.

As shown in FIG. 2, the preferred embodiment of the anti-skid brake control system, according to the present invention, includes a hydraulic brake circuit for controlling braking pressure for respective front-left wheel 10, front-right wheel 11 and rear wheels 12 and 13. The front-left and front-right wheels 10 and 11 are adjustable of their toe direction by means of a known vehicular steering system including a steering wheel 14. A steering angle sensor 15 is associated with the vehicular steering system for monitoring steering angular condition of the vehicle. The steering angle sensor 15 is adapted to produce a steering angle signal representative of the angular variation θ of the steering system.

Although it is not essential for the present invention, the shown embodiment of the anti-skid brake control system is mounted on the vehicle having the front-engine, rear wheel drive lay-out. Therefore, an internal combustion engine mounted on the front end of the vehicle is connected to the rear driving wheels through a known power train including a propeller shaft 16 and a differential gear box 17.

The hydraulic brake circuit includes a power booster 19 and a master cylinder 20 associated with a manual braking means 18, such as a brake pedal. As is well known, the power booster 19 is mechanically connected to a brake pedal so as to boost braking pressure applied to the brake pedal 18 as the manual braking means, and then, transmit the output force to the master cylinder 20. The master cylinder 20 build up hydraulic pressure Pm and output the same to wheel cylinders 10a, 11a, 12a and 13a through a hydraulic circuit. It should be noted that the hydraulic pressure Pm to be built up and outputted from the master cylinder 20 will be hereafter referred to as "master cylinder output pressure".

A pressure control valve unit 22 is disposed within the hydraulic circuit and connects the output ports of the master cylinder 20 to respective wheel cylinders 10a, 11b, 12a and 13a. The pressure control valve unit 22 has two input ports connected to the output ports of the master cylinder 20 and three output ports, onw of which is connected to the wheel cylinders 12a and 13a for the rear wheels 12 and 13, another is connected to a wheel cylinder 10a for the front-left wheel 10 and the other is connected to the wheel cylinder 11a for the front-right wheel 11. A proportioning valve 27 is also disposed within the hydraulic circuit between the output port of the pressure control valve unit 22 and the wheel cylinders 23 and 24. The proportioning valve 27 performs per se well known function for preventing the hydraulic pressure $P_R$ to be applied to the wheel cylinders 23 and 24 from increasing at higher rate than that in the wheel cylinders 25 and 26 for the front wheels.

The pressure control valve unit 22 is operable between various operation modes for adjusting braking pressure in the wheel cylinders 10a, 11a, 12a and 13a in order to maintain the wheel slippage λ at about a known optimum value and to prevent the wheels from skidding. The control mode in which the brake pressure is increased will be hereafter referred to as "application mode". The control mode in which the brake pressure is decreased will be hereafter referred to as "release mode". The mode in which the brake pressure is held essentially constant will be hereafter referred to as "hold mode".

The anti-skid control operation consists of a loop of application mode, hold mode, release mode and hold mode. This loop is repeated throughout the anti-skid brake control operation cyclically. One cycle of the loop of the control variation will be hereafter referred to as "skid cycle".

Figure 3:
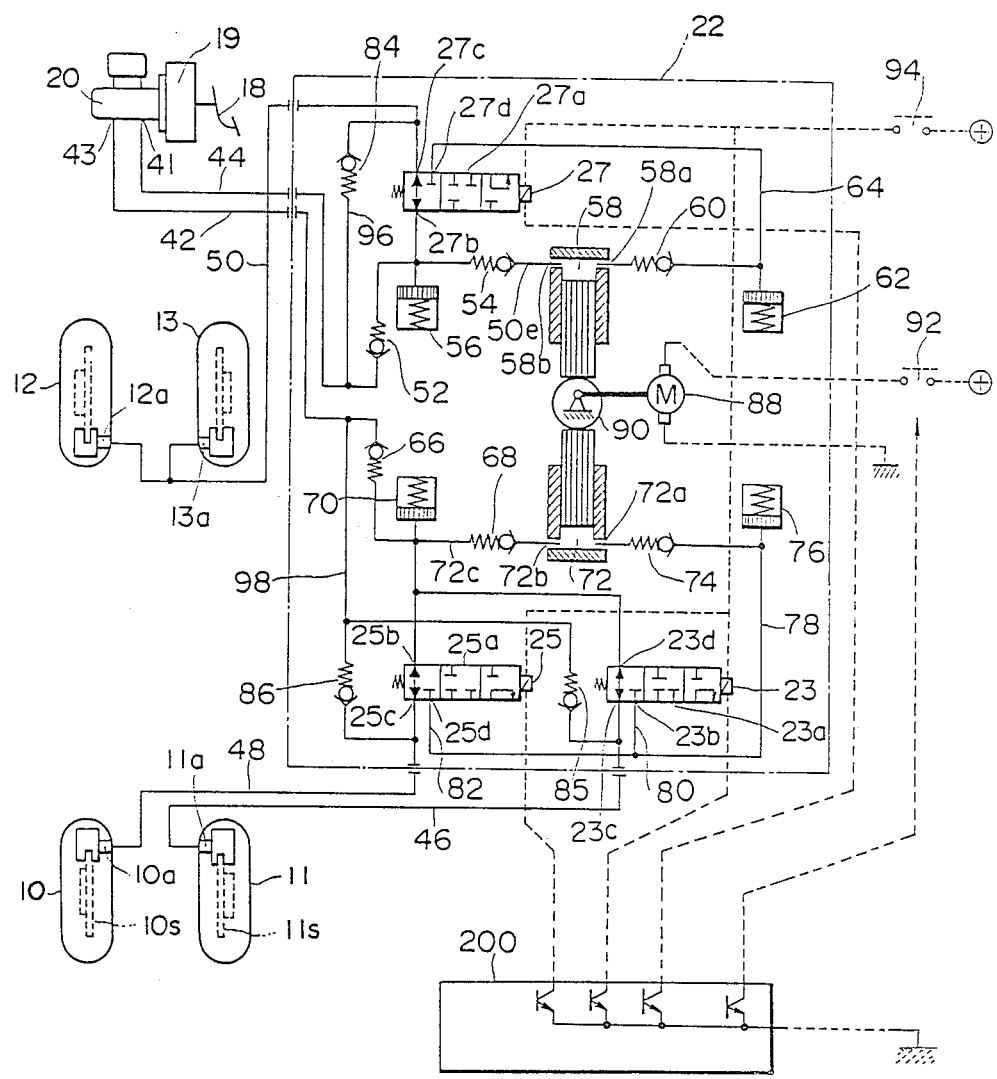
FIG. 3 is a diagram showing a hydraulic brake circuit including a pressure control valve unit to be employed in the preferred embodiment of the anti-skid brake control system of FIG. 2.
Figure 4:
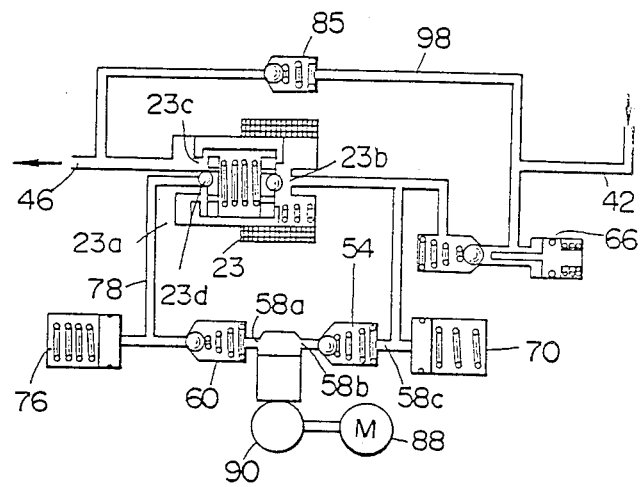
FIGS. 4 to 6 are explanatory illustration showing wheel speed sensors to be employed in the preferred embodiment of the anti-skid brake control system.

The pressure control valve unit 22 is constructed as shown in FIG. 3, for example. The lay-out of the pressure control valve unit 22 will be described in detail below with reference to FIG. 3 which is only an example of the hydraulic brake system to which the preferred embodiment of the anti-skid control system according to the present invention can be applied, and so it should be appreciated that it is not intended to limit the hydraulic system to the shown embodiment. In FIG. 3, one of the outlet ports of the master cylinder is connected to the inlet ports 23b and 25b of electromagnetic flow control valves 23a and 25a, the respective outlet ports 23c and 25c of which are connected to corresponding front left and front right wheel cylinders 10a and 11a, via the secondary pressure line 42. The primary outlet port 41 is connected to the inlet port 27b of the electromagnetic valve 27a, the outlet port 27c of which is connected to the rear wheel cylinders 38a, via the primary pressure line 44. The electromagnetic valves 23a, 25a and 27a also have drain ports 23d, 25d and 27d.

The drain ports 23d and 25d are connected to the inlet port 72a of a fluid pump 90 via drain passages 80, 82 and 78. The fluid pump 90 is associated with an electric motor 88 to be driven by the latter which is, in turn, connected to a motor relay 92, the duty cycle of which is controlled by means of a control signal from the control module 200. While the motor relay 92 is energized to be turned ON, the motor 88 is in operation to drive the fluid pump 90. The drain port 27d of the electromagnetic flow control valve 27a is connected to the inlet port 58a of the fluid pump 90 via a drain passage 64.

The outlet ports 72b and 58b are respectively connected to the pressure lines 42 and 44 via a return passages 72c and 58c. The outlet ports 23c, 25c and 27c of respective electromagnetic flow control valves 23a, 25a and 27a are connected to corresponding wheel cylinders 10a, 11a, 12a and 13a via braking lines 46, 48 and 50. Bypass passages 96 and 98 are provided to connect the braking pressure lines 46 and 48, and 50 respectively to the pressure lines 42 and 44, bypassing the electromagnetic flow control valves. Pump pressure check valves 52 and 66 are installed in the pressure lines 42 and 44. Each of the pump pressure cut valves 66 and 52 is adapted to prevent the working fluid pressurized by the fluid pump 90 from transmitting pressure surges to the master cylinder 24.

Since the fluid pump 90 is designed for quick release of the braking pressure in the braking pressure lines 46, 48 and 50 and thus releasing the wheel cylinders 10a, 11a, 12a and 13a from the braking pressure, it is driven upon release of the brake pedal. This would result in pressure surges in the working fluid from the fluid pump 90 to the master cylinder 24 if the pump pressure check valves 66 and 52 were not provided. The pump pressure check valves 66 and 52 serve as one-way check valves allowing fluid flow from the master cylinder 24 to the inlet ports 23b, 25b and 27b of the electromagnetic valves 23a, 25a and 27a. Pressure accumulators 70 and 56 are installed in the pressure lines 42 and 44, which pressure accumulators serve to accumulate fluid pressure generated at the outlet ports 72b and 58b of the fluid pump 90 while the inlet ports 23b, 25b and 27b are closed. Toward this end, the pressure accumulators 70 and 56 are connected to the outlet ports 72b and 58b of the fluid pump 90 via the return passages 72c and 58c. Outlet valves 68 and 54 are one-way check valves allowing one-way fluid communication from the fluid pump to the pressure accumulators. These outlet valves 68 and 54 are effective for preventing the pressure accumulated in the pressure accumulators 70 and 56 from surging to the fluid pump when the pump is deactivated. In addition, the outlet valves 68 and 54 are also effective to prevent the pressurized fluid flowing through the pressure lines 42 and 44 from flowing into the fluid pump 90 through the return passages 72c and 58c.

Inlet valves 74 and 60 are inserted in the drain passages 78 and 64 for preventing surge flow of the pressurized fluid in the fluid pump 90 to the electromagnetic flow control valves 23a, 25a and 27a after the braking pressure in the wheel cylinders is released. The fluid flowing through the drain passages 78 and 64 is temporarily retained in fluid reservoirs 76 and 62 connected to the former.

Bypass check valves 85, 86 and 84 are inserted in the bypass passages 98 and 96 for preventing the fluid in the pressure lines 42 and 44 from flowing to the braking pressure lines 46, 48 and 50 without first passing through the electromagnetic flow control valves 23a, 25a and 27a. On the other hand, the bypass valves 85, 86 and 84 are adapted to permit fluid flow from the braking pressure line 46, 48 and 50 to the pressure lines 42 and 44 when the master cylinder 24 is released and thus the line pressure in the pressure lines 42 and 44 become less than the pressure in the braking pressure lines 46, 48 and 50.

The electromagnetic flow control valves 23a, 25a and 27a are respectively associated with the actuators 23, 25 and 27 to be controlled by means of the control signals from the control module 200. The actuators 23, 25 and 27 are all connected to the control module 200 via an actuator relay 94, which thus controls the energization and deenergization of them all. Operation of the electromagnetic valve 23a in cooperation with the actuator 23 will be illustrated with reference to FIGS. 4, 5 and 6, in particular illustrating application mode, hold mode and release mode, respectively.

It should be appreciated that the operation of the electromagnetic valves 25a and 27a are substantially the same as that of the valve 23a. Therefore, disclosure of the valve operation of the electromagnetic valves 25a and 27a is neglected in order to avoid unnecessary repetition and to simplify the disclosure.

APPLICATION MODE

In this position, the actuator 23 remains deenergized. An anchor of the electromagnetic valve 23a thus remains in its initial position allowing fluid flow between the inlet port 23b and the outlet port 23c so that the pressurized fluid supplied by the master cylinder 24 via the pressure line 42 may flow to the left front wheel cylinder 10a via the braking pressure line 46. In this valve position, the drain port 23d is closed to block fluid flow from the pressure line 42 to the drain passage 78. As a result, the line pressure in the braking pressure line 46 is increased in proportion to the magnitude of depression of the brake pedal 22 and thereby the fluid pressure in the left front wheel cylinder 30a is increased correspondingly.

In this case, when the braking force applied to the brake pedal is released, the line pressure in the pressure line 42 drops due to return of the master cylinder 24 to its initial position. As a result, the line pressure in the braking pressure line 46 becomes higher than that in the pressure line 42 and so opens the bypass valve 85 to permit fluid flow through the bypass passage 98 to return the working fluid to the fluid reservoir 24a of the master cylinder 24. In the preferring construction, the pump pressure check valve 66, normally serving as a one-way check valve for preventing fluid flow from the electromagnetic valve 23a to the master cylinder 24, becomes wide-open in response to drop of the line pressure in the pressure line below a given pressure.

This allows the fluid in the braking pressure line 46 to flow backwards through the electromagnetic valve 23a and the pump pressure check valve 66 to the master cylinder 24 via the pressure line 42. This function of the pump pressure check valve 66 facilitates full release of the braking pressure in the wheel cylinder 30a.

For instance, the bypass valve 85 is rated at a given set pressure, e.g. 2 kg/cm2 and closes when the pressure difference between the pressure line 42 and the braking pressure line 46 drops below the set pressure. As a result, fluid pressure approximating the bypass valve set pressure tends to remain in the braking pressure line 46, preventing the wheel cylinder 30a from returning to the fully released position. In order to avoid this, in the shown embodiment, the one-way check valve function of the pump pressure check valve 66 is disabled when the line pressure in the pressure line 42 drops below a predetermined pressure, e.g. 10 kg/cm2. When the line pressure in the pressure line 42 drops below the predetermined pressure, a bias force normally applied to the pump pressure check valve 66 is released, freeing the valve to allow fluid flow from the braking pressure line 46 to the master cylinder 24 via the pressure line 42.

HOLD MODE

In this control mode, a limited first value, e.g. 2A of electric current serving as the control signal is applied to the actuator 23 to position the anchor closer to the actuator 23 than in the previous case. As a result, the inlet port 23b and the drain port 23d are closed to block fluid communication between the pressure line 42 and the braking pressure line 46 and between the braking pressure line and the drain passage 78. Therefore, the fluid pressure in the braking pressure line 46 is held at the level extant at the moment the actuator is operated by the control signal.

In this case, the fluid pressure applied through the master cylinder flows through the pressure check valve 66 to the pressure accumulator 70.

RELEASE MODE

In this control mode, a maximum value, e.g. 5A of electric current serving as the control signal is applied to the actuator 23 to shift the anchor all the way toward the actuator 23. As a result, the drain port 23d is opened to establish fluid communication between the drain port 23d and the outlet port 23c. At this time, the fluid pump 90 serves to facilitate fluid flow from the braking pressure line 46 to the drain passage 78. The fluid flowing through the drain passage is partly accumulated in the fluid reservoir 76 and the remainder flows to the pressure accumulator 70 via the check valves 60 and 54 and the fluid pump 90.

It will be appreciated that, even in this release mode, the fluid pressure in the pressure line 42 remains at a level higher or equal to that in the braking pressure line 46, so that fluid flow from the braking pressure line 46 to the pressure line 42 via the bypass passage 98 and via the bypass check valve 85 will never occur.

In order to resume the braking pressure in the wheel cylinder (FL) 10a after once the braking pressure is reduced by positioning the electromagnetic valve 23a in the release position, the actuator 23 is again deenergized. The electromagnetic valve 23a is thus returns to its initial position to allow the fluid flow between the inlet port 23b and the outlet port 23c so that the pressurized fluid may flow to the left front wheel cylinder 10a via the braking pressure line 46. As set forth the drain port 23d is closed to block fluid flow from the pressure line 42 to the drain passage 78.

As a result, the pressure accumulator 70 is connected to the left front wheel cylinder 10a via the electromagnetic valve 23a and the braking pressure line 46. The pressurized fluid in the pressure accumulator 70 is thus supplied to the wheel cylinder 10a so as to resume the fluid pressure in the wheel cylinder 10a.

At this time, as the pressure accumulator 70 is connected to the fluid reservoir 76 via the check valves 60 and 54 which allow fluid flow from the fluid reservoir to the pressure accumulator, the extra amount of pressurized fluid may be supplied by the fluid reservoir.

The actuators 23, 25 and 27 of the pressure control valve unit 22 is associated with the control module 200 to be controlled respective valve positions between aforementioned APPLICATION mode position, RELEASE mode position and HOLD mode position. Therefore, the controller 200 performs anti-skid bracke control for maintaining the wheel slippage at optimum level as long as possible. In order to perform anti-skid brake control, the control module 200 is connected to wheel speed sensors 10s, 11s and 16s. The wheel speed sensors 10a and 11s are adapted to monitor rotation speed of the front-left and front right wheels 10 and 11. On the other hand, the wheel speed sensor 16s is adapted to monitor rotation speed of the propeller shaft 16 as an average rotation speed of the rear wheels 12 and 13.

Figure 7:
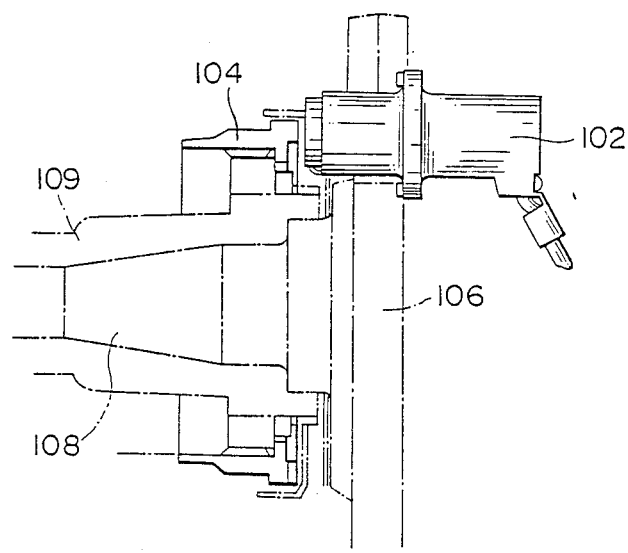
FIGS. 7 and 8 are illustration showing an example of a wheel speed sensor for monitoring rotation speed of front wheels, which can be employed in the preferred embodiment of the anti-skid brake control system according to the invention.

FIG. 7 shows the structure of the wheel speed sensor for detecting the rate of rotation of the left front wheel. Each of the wheel speed sensors 10s and 11s generally comprises a sensor rotor 104 adapted to rotate with the vehicle wheel, and a sensor assembly 102 fixedly secured to the shim portion 106 of the knuckle spindle 108. The sensor rotor 104 is fixedly secured to a wheel hub 109 for rotation with the vehicle wheel.

Figure 9:
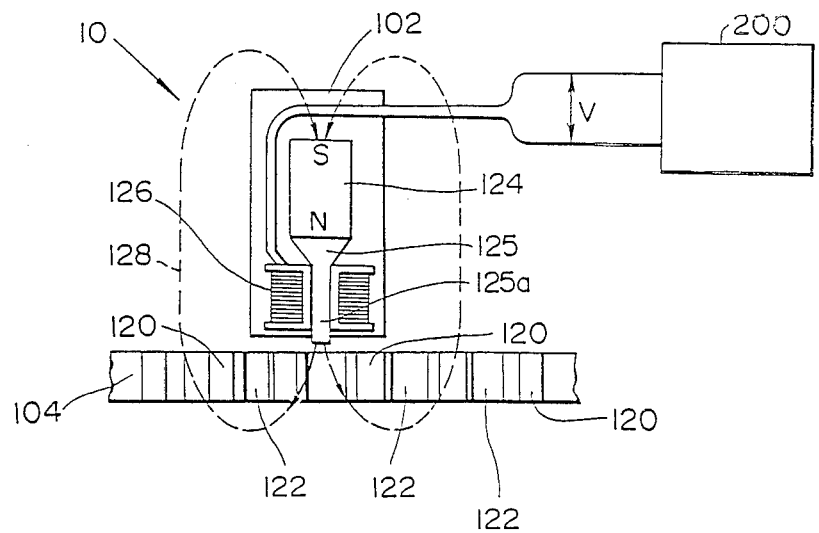
FIG. 9 is an illustation showing an example of a wheel speed sensor for monitoring an average rotation speed of rear wheels, which can be employed in the preferred embodiment of the anti-skid brake control system of the invention.

As shown in FIG. 9, the sensor rotor 104 is formed with a plurality of sensor teeth 120 at regular angular intervals. The width of the teeth 120 and the grooves 122 therebetween are equal in the shown embodiment and define a unit angle of wheel rotation.

The sensor assembly 102 comprises a magnetic core 124 aligned with its north pole (N) near the sensor rotor 104 and its south pole (S) distal from the sensor rotor. A metal element 125 with a smaller diameter section 125a is attached to the end of the magnetic core 124 nearer the sensor rotor. The free end of the metal element 125 faces the sensor teeth 120. An electromagnetic coil 126 encircles the smaller diameter section 125a of the metal element. The electromagnetic coil 126 is adapted to detect variations in the magnetic field generated by the magnetic core 124 to produce an alternating-current sensor signal. That is, the metal element and the magnetic core 124 form a kind of proximity switch which adjusts the magnitude of the magnetic field depending upon the distance between the free end of the metal element 125 and the sensor rotor surface. Thus, the intensity of the magnetic field fluctuates in relation to the passage of the sensor teeth 120 and accordingly in relation to the angular velocity of the wheel.

Figure 8:
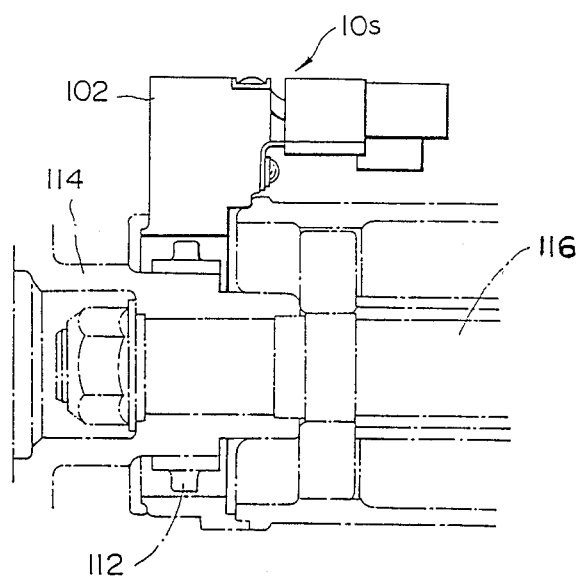

FIG. 8 shows the structure of the rear wheel speed sensor 10s. As with the aforementioned left front wheel speed sensor 10, the rear wheel speed sensor 14 comprises a sensor rotor 112 and a sensor assembly 102. The sensor rotor 112 is associated with a companion flange 114 which is, in turn, rigidly secured to a drive shaft 116 for rotation therewith. Thus, the sensor rotor 112 rotates with the drive shaft 116. The sensor assembly 102 is fixed to a final drive housing or a differential gear box (not shown). Each of the sensor assemblies applied to the left and right front wheel speed sensors and the rear wheel sensor is adapted to output an alternating-current sensor signal having a frequency proportional to or corresponding to the rotational speed of the corresponding vehicle wheel. The electromagnetic coil 126 of each of the sensor assemblies 102 is connected to the control module 200 to supply the sensor signals thereto.

The control module 200 receives the sensor signals from the wheel speed sensors 10s, 11s and 16s for deriving peripheral speeds of respective of the front-left wheel 10, the front-right wheel and the rear wheels 13 and 14.

In general, anti-skid brake control is performed on the basis of the wheel acceleration $a_w$ and wheel slippage $\lambda$. Therefore, the controller derives wheel acceleration $a_W$ and the wheel slippage $\lambda$ according to a known process. For example, the wheel rotation speed Vw of each wheel is calculated in response to each sensor pulse. As is well known, the wheel speed is generally inversely proportional to the intervals between the sensor pulses, and accordingly, the wheel speed Vw is derived from the interval between the last sensor pulse input time and the current sensor pulse input time. A target wheel speed Vi the resultant wheel speed Vw. In addition, the slip rate is derived from the rate of change of the wheel speed and an projected speed Vv which is estimated from the wheel speed at the moment the brakes are applied based on the assumption of a continuous, linear deceleration without slippage. In general, the target wheel speed Vi is derived from the wheel speed of the last skid cycle during which the wheel deceleration value was equal to or less than a given value which will be hereafter referred to as "deceleration threshold $\alpha_{ref}$", and the wheel speed of the current skid cycle, and by estimating the rate of change of the wheel speed between wheel speeds at which the rate of deceleration is equal to or less than the deceleration threshold. In practice, the first target wheel speed Vi is derived based on the projected speed Vv which corresponds to a wheel speed at the initial stage of braking operation and at which wheel deceleration exceeds a predetermined value, e.g. $-1.2G$, and a predetermined deceleration value, for example 0.4G. The subsequent target wheel speed Vi is derived based on the projected speed $V_v$ in last two skid cycles. For instance, the deceleration value of the target wheel speed $V_i$ is derived from a difference of the projected speeds Vv in the last two skid cycle and a period of time in which wheel speed varies from the first projected speed to the next projected speed. Based on the last projected speed and the deceleration value, the target wheel speed in the current skid cycle skid cycle is derived.

The acceleration of the wheel is generally derived based on input times of the successive three sensor pulses. Since the interval of the adjacent sensor signal pulses corresponds wheel speed and the wheel speed is a function of the reciprocal of the interval, by comparing adjacent pulse-to-pulse intervals, a value corresponding to variation or difference of the wheel speed. The resultant may be divided by the period of time in order to obtain the wheel acceleration at the unit time. Therefore, the acceleration or deceleration of the wheel is derived from the following equation:

$$a_w = \left(\frac{1}{C-B} - \frac{1}{B-A}\right) / \left(\frac{C-A}{2}\right) \quad (1)$$

where A, B and C are the input times of the sensor pulses in the order given.

On the other hand, the slip rate $\lambda$ is a rate of difference of wheel speed relative to the vehicle speed which is assumed as substantially corresponding to the target wheel speed. Therefore, in the shown embodiment, the target wheel speed $V_i$ is taken as variable or parameter indicative of the assumed or projected vehicle speed. The slip rate $\lambda$ can be obtained by dividing a difference between the target wheel speed $V_i$ and the instantaneous wheel speed $V_w$ by the target wheel speed. Therefore, in addition, the slip rate $\lambda$ is derived by solving the following equation:

$$\lambda = V_i - V_w / V_i \quad (2)$$

Finally, the control module 200 determines the control mode, i.e., release mode, hold mode and application mode from the slip rate $\lambda$ and the wheel acceleration or deceleration $a_w$.

In anti-skid brake control, the braking force applied to the wheel cylinder is to be so adjusted that the peripheral speed of the wheel, i.e. the wheel speed, during braking is held to a given ratio, e.g. 85% to 80% of the vehicle speed. Therefore, the slip rate $\lambda$ has to be maintained below a given ratio, i.e., 15% to 20%. In the preferred embodiment, the control system controls the braking force so as to maintain the slip rate about 15%. Therefore, a reference value $\lambda_{ref}$ to be compared with the slip rate $\lambda$ is determined at a value at 85% of the projected speed $V_v$. As will be appreciated, the reference value is thus indicative of a slip rate threshold, which will be hereafter referred to "slip rate threshold $\lambda_{ref}$" throughout the specification and claims, and varies according to variation of the target wheel speed.

Figure 5:
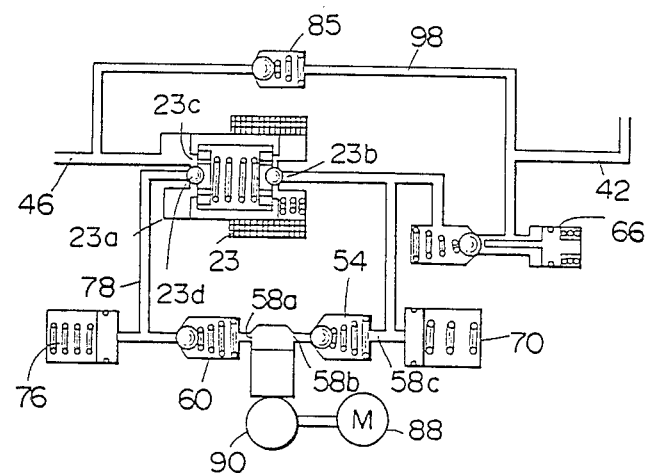
Figure 6:
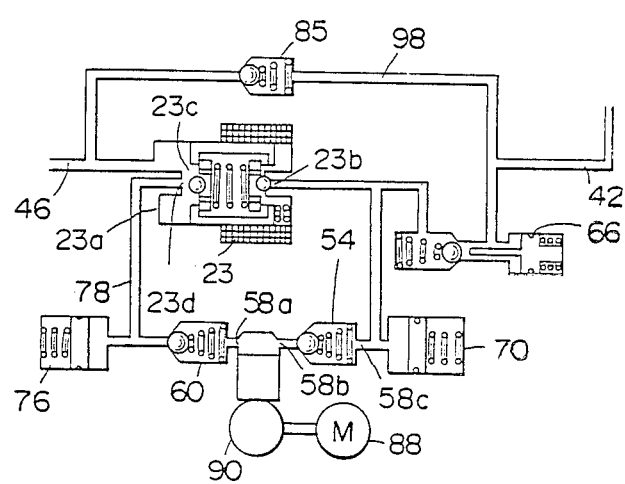

In practical brake control operation performed by the preferred embodiment of the anti-skid control system according to the present invention, the electric current applied to the actuator becomes a limited value, e.g., 2A to place the electromagnetic valve of the pressure control valve unit in the hold mode as shown in FIG. 5 when the wheel speed remains inbetween the target wheel speed $V_i$ and the slip rate threshold $\lambda_{ref}$. When the slip rate $\lambda$ derived from the target wheel speed $V_i$ and the wheel speed $V_w$ becomes equal to or greater than the slip rate threshold $\lambda_{ref}$, then the supply current to the actuator 16 is increased to a maximum value, e.g. 5A to operate the electromagnetic valve to the release mode. By maintaining the release mode, the wheel speed $V_w$ is recovered to the target wheel speed. When the wheel speed is thus recovered or resumed so that the slip rate $\lambda$ at that wheel speed becomes equal to or less than the slip rate threshold $\lambda_{ref}$, then the supply current to the actuator is dropped to the limited value, e.g. 2A to return the electromagnetic valve to the hold mode.

By holding the reduced fluid pressure in the wheel cylinder, the wheel speed $V_w$ is further resumed to the target wheel speed $V_i$. When the wheel speed $V_w$ is resumed equal to or higher than the target wheel speed $V_i$, the supply current is further dropped to zero for placing the electromagnetic valve in the application mode. The electromagnetic valve is maintained in the application mode until the wheel speed is decelerated at a wheel speed at which the wheel deceleration $a_w$ becomes equal to or slightly more than the deceleration threshold $a_{ref}$ e.g. 0G. At the same time, the projected speed $V_v$ is again derived with respect to the wheel speed at which the wheel deceleration $a_w$ becomes equal to or slightly greater than the deceleration threshold $a_{ref}$. From a difference of speed of the last projected speed and the instant projected speed and the period of time from a time obtaining the last projected speed to a time obtaining the instant projected speed, a deceleration rate of the target wheel speed $V_i$ is derived. Therefore, assuming the last projected speed is $V_{v1}$, the instant projected speed is $V_{v2}$, and the period of time is $T_v$, the target wheel speed $V_i$ can be obtained from the following equation:

$$V_i = V_{v2} - (V_{v1} - V_{v2}) / T_v \times t_e$$

where $t_e$ is an elapsed time from the time at which the instant projected speed $V_{v2}$ is obtained.

Based on the input timing, deceleration value $a_w$ is derived from the foregoing equation (1). In addition, the projected speed $V_v$ is estimated as a function of the wheel speed $V_w$ and rate of change thereof. Based on the instantaneous wheel speeds $V_{w1}$ at which the wheel deceleration is equal to or less than the deceleration threshold $\alpha_{ref}$ and the predetermined fixed value, e.g. 0G for the first skid cycle of control operation, the target wheel speed $VL_i$ is calculated.

According to equation (2), the slip rate $\lambda$ is calculated, using successive wheel speed values $V_{w1}$, $V_{w2}$, $V_{w3}$ ... as parameters. The derived slip rate $\lambda$ is compared with the slip rate threshold $\lambda_{ref}$. As the wheel speed Vw drops below the projected speed $V_v$, the control module 200 switches the control mode from the application mode to the hold mode. Assuming also that the slip rate $\lambda$ exceeds the slip rate threshold $\lambda_{ref}$, then the control module 200 switches the control mode to the release mode to release the fluid pressure at the wheel cylinder.

Upon release of the brake pressure in the wheel cylinder, the wheel speed Vw recovers, i.e. the slip rate $\lambda$ drops until it is less then the slip rate threshold $\lambda_{ref}$.

The control module 200 detects when the slip rate $\lambda$ is less than the slip rate threshold $\lambda_{ref}$ and switches the control mode from release mode to the hold mode.

By maintaining the brake system in the hold mode in which reduced brake pressure is applied to the wheel cylinder, the wheel speed increases until it reaches the projected speed. When the wheel speed $V_w$ becomes equal to the target wheel speed $V_w$, the control module 200 switches the control mode from the hold mode to the application mode.

As can be appreciated from the foregoing description, the control mode will tend to cycle through the control modes in the order application mode, hold mode, release mode and hold mode. This cycle of variation of the control modes will be referred to hereafter as "skid cycle". Practically speaking, there will of course be some hunting and other minor deviations from the standard skid cycle.

The projected speed $V_v$, which is meant to represent ideal vehicle speed behavior, at time $t_1$ can be obtained directly from the wheel speed $V_w$ at that time since zero slip is assumed. At the same time, the deceleration rate of the vehicle will be assumed to be a predetermined fixed value or the appropriate one of a family therof, in order to enable calculation of the target wheel speed for the first skid cycle operation. Specifically, in the shown example, the projected speed $V_v$ will be derived from the wheel speed $V_{w1}$ at a time, at which the wheel acceleration $\alpha_w$ lower than the deceleration threshold $\alpha_{ref}$. Using the predetermined deceleration rate, the projected speed will be calculated at each time the wheel deceleration $\alpha_w$ in the application mode reaches the deceleration threshold $\alpha_{ref}$.

It should be appreciated that the foregoing example of derivation of the wheel acceleration $\alpha_w$ and the wheel slip or slippage $\lambda$ is to be reagrded as mere example, and can be performed in various ways to be deemed appropriate for deriving at required accuracy. For example, U.S. Pat. No. 4,392,202, issued to Toshiro MATSUDA, on July 5, 1983, U.S. Pat. No. 4,384,330, issued to Toshiro MATSUDA, and U.S. Pat. No. 4,430,714, issued to Toshiro MATSUDA, on Feb. 7, 1984, and respectively assigned to the common assigee to the present invention, disclose other way of deriving the wheel speed, wheel acceleration, and the target wheel speed to be utilized for deriving the wheel slippage are disclosed. The process disclosed in the foregoing U.S. patents are also applicable for performing the preferred process of the present invention. Therefore, the disclosures of the foregoing U.S. patents are herein incorporated by reference for the sake of disclosure.

As set forth, according to the present invention, the wheel slippage threshold $\lambda_{ref}$ is variable depending upon the transverse or lateral force to be exert on the vehicle body. In order to monitor the transverse force on the vehicle body, the preferred embodiment of the anti-skid brake control system includes the steering angle sensor 15. Also, if necessary, the anti-skid brake control system further includes a yaw rate sensor 31. The yaw rate sensor 31 may comprise a transverse force (G) sensor which has been disclosed in the Japanese Patent First Publication (Tokkai) Showa No. 56-90754, published on July 23, 1981, which is owned by the common owner to the present invention. The construction of the transverse force sensor and the process of monitoring the transverse force disclosed in the foregoing Japanese publication is herein incorporated by reference for the sake of disclosure. Otherwise, any appropriate sensor which is appropriate for monitoring yawing motion of the vehicle or transverse force applied to the vehicle can be employed as the yaw rate sensor 31.

The steering angle sensor 15 is adapted to produce a steering angle signal $S_\theta$ indicative of the steering angle $\theta$. On the other hand, the yaw rate sensor 31 is adapted to monitor yawing motion of the vehicle and produces a yawing magnitude indicative signal S. The steering angle $S_\theta$ and the yawing magnitude indicative signal S are also fed to the control module 200.

Figure 11:
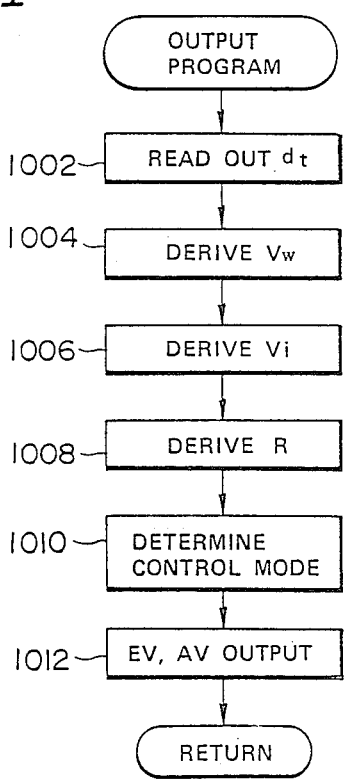
FIG. 11 is a flowchart of an anti-skid control signal derivation program to be executed by a control module in the preferred embodiment of the anti-skid brake control system.
Figure 13:
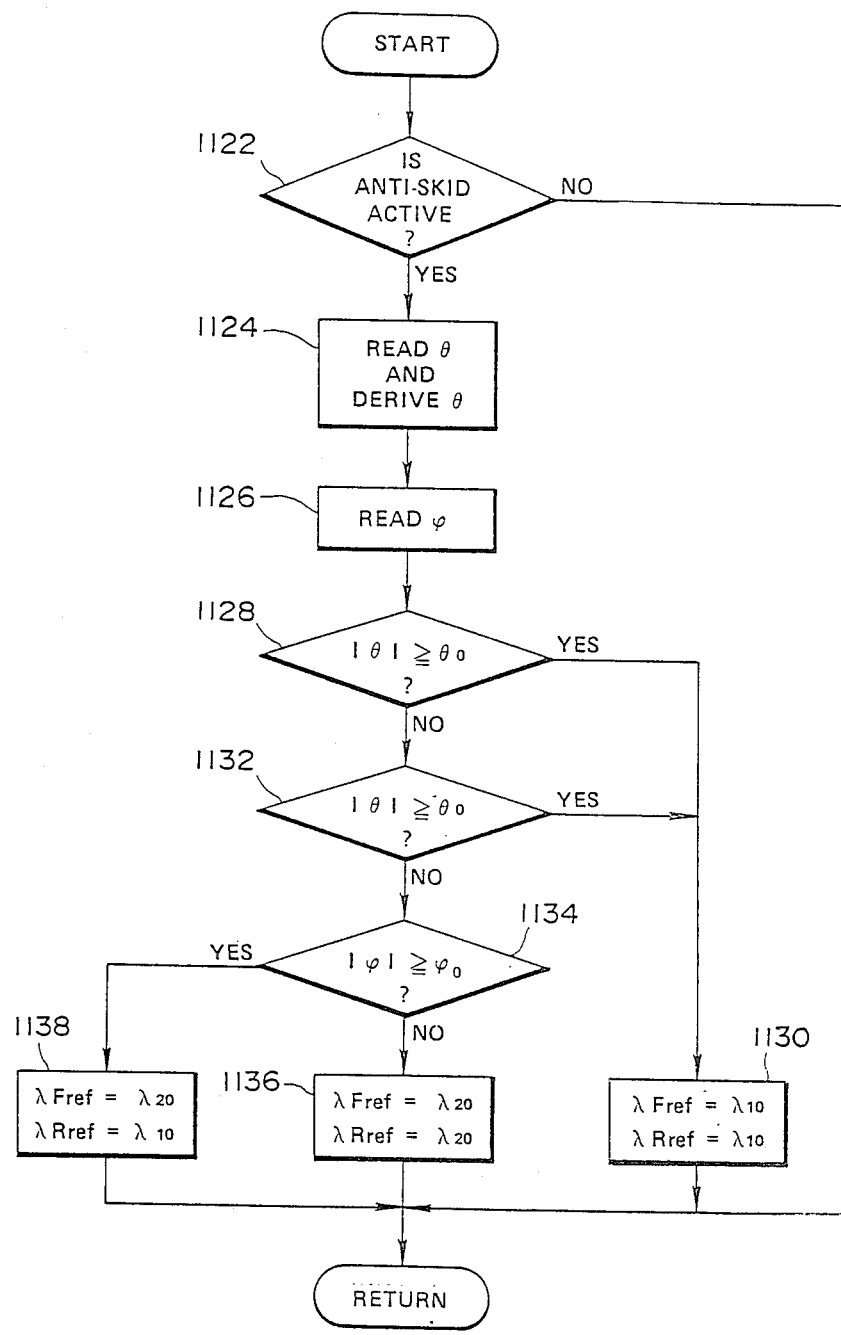
FIG. 13 is a flowchart of a modified program for setting the wheel slippage threshold.

The anti-skid brake control operation including derivation of the wheel slippage threshold $\lambda_{ref}$ which is derived on the basis of the steering angle $S_\theta$ and the yawing magnitude indicative signal S, will be disclosed herebelow with reference to FIGS. 11 to 13. FIG. 11 shows the output program for deriving the wheel speed $V_w$, wheel acceleration $\alpha_w$ and slip rate $\lambda$, selecting the operational mode, i.e. application mode, hold mode and release mode and outputting an inlet signal EV and/or an outlet signal AV depending upon the selected operation mode of the actuator. When the application mode is selected the inlet signal EV goes HIGH and the outlet signal EV goes HIGH. When the release mode is selected, the inlet signal EV goes LOW and the outlet signal AV also goes LOW. When the selected mode is hold mode, the inlet signal EV remains HIGH while the outlet signal AV goes LOW. These combinations of the inlet signal EV and the outlet signal AV correspond to the actuator supply current levels and thus actuate the electromagnetic valve to the corresponding positions illustrated in FIGS. 4, 5 and 6.

The output program is stored in the memory of the control module 200 and adapted to be read out periodically, e.g. every 10 ms, to be executed as an interrupt program. During execution of the output calculation program, the pulse interval T is read out from a memory in the control module 200, which stores the pulse interval, at a block 1002. As set forth above, since the pulse interval T is inversely proportional to the wheel rotation speed $V_w$, the wheel speed can be derived by calculating the reciprocal (1/T) of the pulse interval T. This calculation of the wheel speed $V_w$ is performed at a block 1004 in the output program. After the block 1004, the target wheel speed $V_i$ is calculated at a block 1006. Manner of deriving the target wheel speed $V_i$ has been illustrated in the forgoing U.S. Pat. Nos. 4,392,202, 4,384,330 and 4,430,714. The disclosure of the aboveidentified three U.S. patents are herein incorporated by reference for the sake of disclosure.

As is obvious from the disclosure set out above, the target wheel speed $V_i$ is derived as a function of wheel speed deceleration as actually detected. For instance, the wheel speed $V_w$ at which the wheel deceleration $\alpha_w$ exceeds the deceleration threshold aref, e.g. $-1.2G$ is taken as one reference point for deriving the target wheel speed $V_i$. The wheel speed, at which the wheel deceleration $\alpha_w$ also exceeds the deceleration threshold $\alpha_{ref}$, is taken as the other reference point. An interval of derivation of the target wheel speed $V_i$ is also measured. Based on the wheel speed $V_{w1}$ and $V_{w2}$ and the measured period P, the deceleration value $\Delta V_i$ is derived from:

$$\Delta V_i = (V_{w1} - V_{w2})/P \qquad (4)$$

This target wheel speed $V_i$ is used for skid control in the next skid cycle.

It should be appreciated that in the first skid cycle, the target wheel speed $V_i$ cannot be obtained. Therefore, for the first skid cycle, a predetermined fixed value will be used as the target wheel speed $V_i$.

At a block 1008, the slip rate $\lambda$ is calculated according to the foregoing formula (2). Subsequently, the operational mode is determined on the basis of the wheel acceleration $\alpha_w$ and the slip rate $\lambda$, at a block 1010.

Figure 10:
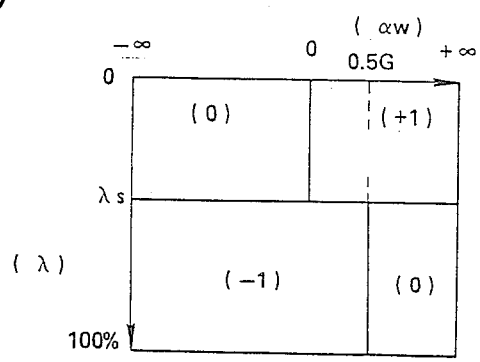
FIG. 10 shows a table showing variation of operation mode of the anti-skid brake control system variable depending upon the wheel acceleration and wheel slippage.

The schedule of operation mode selection of the actuator is illustrated in the form of a table in FIG. 10. As set out above, when the wheel slip rate $\lambda$ is in the range of equal to or greater than 0% to equal to or less than a wheel slippage threshold $\lambda_{ref}$, e.g. 15%, the hold mode is selected when the wheel acceleration $\alpha_w$ is less then 0G and the application mode is selected when the wheel acceleration $\alpha_w$ is above 0G. On the other hand, when the slip rate $\lambda$ remains above the wheel slippage threshold $\lambda_{ref}$, e.g. 15%, the release mode is selected when the wheel acceleration $\alpha_w$ is equal to or less than 0.5G, and the hold mode is selected when the wheel acceleration is above 0.5G.

According to the operational mode selected at the block 1010, the signal levels of the inlet signal EV and the outlet signal AV are determined so that the combination of the signal levels corresponds to the selected operation mode of the actuator. The determined combination of the inlet signal EV and the outlet signal AV are output to the actuator to control the electromagnetic valve.

It should be appreciated that, although the execution timing of the output calculation program has been specified to be about 10 ms in the foregoing disclosure, the timing is not necessarily fixed to the mentioned timing and may be selectable from the approximate range of 1 ms to 20 ms. The execution timing of the output program is fundamentaly to be determined in accordance with the response characteristics of the actuator.

FIG. 12 shows a sub-routine for deriving the wheel slippage threshold $\lambda_{ref}$. In the sub-routine of FIG. 12, the wheel slippage threshold $\lambda_{ref}$ is derived on the basis of the steering angle signal value indicative of the steering angle $\theta$. In the sub-routine, at first, checking is performed whether the anti-skid brake control is active or not, at a block 1102. If not, the process returns to the main routine. On the other hand, when active condition of the anti-skid control is detected as checked at the block 1102, then the steering angle signal value $\theta$ is read out, at a block 1104. In the block 1104, a steering angular velocity $\dot{\theta}$ is derived on the basis of the read steering angle signal values $\dot{\theta}$. Thereafter, at a block 1106, the absolute value $|\theta|$ is compared with a steering angle reference value $\theta_o$. If the absolute value $|\theta|$ is equal to or greater than the steering angle reference value $\theta_o$, then the wheel slippage reference $\lambda_{ref}$ is derived at a lower value $\lambda_{10}$, at a block 1108. On the other hand, when the absolute value $|\theta|$ is smaller than the steering angle reference value $\theta_o$ as checked at the block 1106, the absolute value $|\dot{\theta}|$ of the steering angular velocity is compared with the steering velocity reference value $\dot{\theta}_o$, at a block 1110. If the absolute value $|\dot{\theta}|$ is equal to or greater than the steering angle reference value $\dot{\theta}_o$, then the wheel slippage reference $\lambda_{ref}$ is derived at a smaller value $\lambda_{10}$, at the block 1108. On the other hand, when the absolute value $|\dot{\theta}|$ is smaller than the steering angle reference value $\dot{\theta}_o$ as checked at the block 1110, the wheel slippage threshold $\lambda_{ref}$ is derived at a higher value $\lambda_{20}$, at a block 1112.

FIG. 13 shows a modified sub-routine for deriving the wheel slippage threshold. In this modified sub-routine, the vehicular yawing rate as monitored by the yaw rate sensor 31 will be taken into account in deriving the wheel slippage threshold in addition to the steering conditions as set forth above. Furthermore, in this modified routine, the wheel slippage threshold for the front wheels 10 and 11 can be derived separately from that for the rear wheels 12 and 13. In the following disclosure for the modified sub-routine, the wheel slippage threshold for the front wheels will be referred to as "front wheel slippage threshold $\lambda_{Fref}$" and the wheel slippage threshold for the rear wheels will be referred to as "rear wheel slippage threshold $\lambda_{Rref}$".

In the modified sub-routine of FIG. 13, at first, checking is performed whether the anti-skid brake control is active or not, at a block 1122. If not, the process returns to the main routine. On the other hand, when active condition of the anti-skid control is detected as checked at the block 1122, then the steering angle signal value $\theta$ is read out, at a block 1124. In the block 1124, a steering angular velocity $\dot{\theta}$ is derived on the basis of the read steering angle signal values $\theta$. At a block 1126, the yawing magnitude indicative signal value output from the yaw rate sensor 31 is read out. At the block 1126, the absolute value is derived from the yawing magnitude indicative signal values. Thereafter, at a block 1128, the absolute value $|\theta|$ is compared with a steering angle reference value $\theta_o$. If the absolute value $|\theta|$ is equal to or greater than the steering angle reference value $\theta_o$, then both of the front and rear wheel slippage references $\lambda_{Fref}$ and $\lambda_{Rref}$ are derived at a lower value $\lambda_{10}$, at a block 1130. On the other hand, when the absolute value $|\theta|$ is smaller than the steering angle reference value $\theta_o$ as checked at the block 1128, the absolute value $|\dot{\theta}|$ of the steering angular velocity is compared with the steering velocity reference value $\dot{\theta}_o$, at a block 1132. If the absolute value $|\dot{\theta}|$ is equal to or greater than the steering angle reference value $\dot{\theta}_o$, then both of the front and rear wheel slippage references $\lambda_{Fref}$ and $\lambda_{Rref}$ are derived at a smaller value $\lambda_{10}$, at the block 1130. On the other hand, when the absolute value $|\dot{\theta}|$ is smaller than the steering angle reference value $\dot{\theta}_o$ as checked at the block 1132, the absolute value $|\dot{\theta}|$ of the yawing magnitude indicative signal value is compared with a yawing magnitude reference value $\dot{\theta}_o$, at a block 1134. If the absolute vavlue of the yawing magnitude indicative signal value is smaller than the yawing magnitude reference value $\dot{\theta}_o$, then both of the front and rear wheel slippage threshold values $\lambda_{Fref}$ and $\lambda_{Rref}$ are derived at a higher value $\lambda_{20}$, at a block 1136. On the other hand, when the absolute value is equal to or greater than the yawing magnitude reference value $\theta_o$, then the front wheel slippage threshold $\lambda_{Fref}$ is set at the higher threshold value $\lambda_{20}$ and the rear wheel slippage threshold $\lambda_{Rref}$ is set at the lower threshold value $\lambda_{10}$, at a block 1138.

Figure 14:
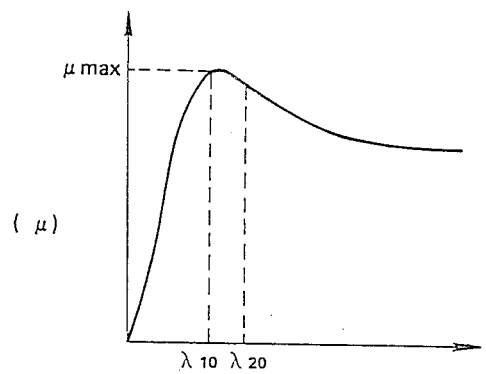
FIG. 14 is a graph showing relationship between the wheel slippage and friction coefficient.
Figure 15:
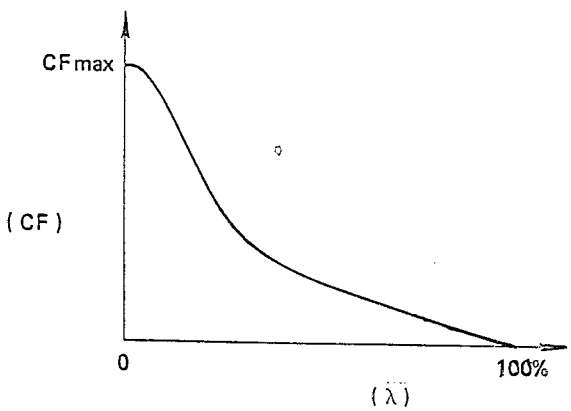
FIG. 15 shows relationship between a cornering force of the vehicle and the wheel slippage.

It should be appreciated that the lower wheel slippage threshold value $\lambda_{10}$ is set at the value at which the maximum wheel friction $\mu_{max}$ can be obtained, as shown in FIG. 14. On the other hand, as shown in FIG. 14, the higher wheel slippage threshold value $\lambda_{20}$ is selected at the point where the wheel friction is slightly less than the maximum friction $\mu_{max}$. By setting the lower slippage threshold at the point where the maximum friction $\mu_{max}$ is obtained, the greater counter force against the lateral yawing moment exerting on the vehicle body can be obtained in comparison with that obtained at the higher slippage threshold $\lambda_{20}$.

Therefore, according to the present invention, a good balance between of braking performance and the cornering stability can be achieved.

Thus, the present invention fulfills all of the objects and advantages sought therefor.

What is claimed is:

1. An anti-skid brake control system for an automotive vehicle comprising:
   a hydraulic brake circuit for building up braking fluid pressure according to manual braking operation and distributing fluid pressure to at least one wheel cylinder;
   a pressure control valve unit disposed within said hydraulic brake circuit for varying valve positions between a first position in which fluid pressure in the wheel cylinder is increased according to the increase in said braking pressure built up in said hydraulic brake circuit, and a second position in which said fluid pressure in said wheel cylinder is decreased;
   a first sensor for producing a wheel speed indicative signal representative of a rotation speed of a vehicular wheel;
   a second sensor for producing a lateral force indicative signal representative of a lateral force applied to a vehicle body;
   a controller receiving said wheel speed indicative signal for deriving a control signal for operating said pressure control valve unit between said first and second positions, said controller deriving a wheel slippage based on said wheel speed and comparing derived wheel slippage with a given reference value so as to operate said pressure valve to said second position when the derived wheel slippage is greater than said given reference value, said controller being further operable for deriving said given reference value on the basis of the magnitude of the lateral force exerted on the vehicle body for adjusting said given reference value depending upon the lateral force magnitude, said controller comparing said lateral force indicative signal value with a given threshold representative of a lateral force criterion and responsive to said lateral force indicative signal having a value greater than said given threshold for decreasing said given reference value.

2. An anti-skid brake control system as set forth in claim 1, wherein said second sensor comprises a yaw rate sensor for monitoring magnitude of yawing motion of the vehicle and producing a yawing rate indicative signal serving as said lateral force indicative signal.

3. An anti-skid brake control system as set forth in claim 1, wherein said second sensor comprises a steering angle sensor for monitoring steering angular variation and producing a steering angle indicative signal serving as said lateral force indicative signal.

4. An anti-skid brake control system as set forth in claim 3, wherein said second sensor further includes a yaw rate sensor for monitoring the magnitude of yawing motion of the vehicle and producing a yawing rate indicative signal serving as said lateral force indicative signal.

5. An anti-skid brake control system for an automotive brake system comprising:
   a hydraulic brake system including a wheel cylinder for applying braking pressure to a vehicle wheel, and a pressure control valve associated with said wheel cylinder for adjusting fluid pressure in the wheel cylinder, said pressure control valve being operative to increase fluid pressure in said wheel cylinder in a first position, to decrease fluid pressure in said wheel cylinder in a second position and to hold fluid pressure in said wheel cylinder constant in a third position;
   a wheel speed sensor detecting rotation speed indicative signal having a value indicative of the detected wheel speed;
   a lateral force sensor for producing a lateral force indicative signal representative of a lateral force applied to a vehicle body;
   a controller deriving a control signal for controlling operation of said pressure control valve to actuate the latter to one of said first, second and third position on the basis of said wheel speed indicative signal so as to control wheel speed in a given optimal relationship with vehicle speed, said controller deriving a wheel slippage based on said wheel speed and comparing derived wheel slippage with a given reference value which is representative of a predetermined wheel slippage criterion so as to operate said pressure control valve to said second position when the derived wheel slippage is greater than said given reference value, and said controller being further operable for deriving said given reference value on the basis of the magnitude of the lateral force exerted on the vehicle body for adjusting said given reference value depending upon the lateral force magnitude, said controller comparing said lateral force indicative signal value with a given threshold representative of a lateral force criterion and responsive to said lateral force indicative signal having a value greater than said given threshold for decreasing said given reference value.

6. An anti-skid brake control system for an automotive brake system comprising:
   a hydraulic brake system including a wheel cylinder for applying braking pressure to a vehicle wheel, and a pressure control valve associated with said wheel cylinder for adjusting fluid pressure in the wheel cylinder, said pressure control valve being operative to increase fluid pressure in said wheel cylinder in a first position, to decrease fluid pressure in said wheel cylinder in a second position and to hold fluid pressure in said wheel cylinder constant in a third position;

a wheel speed sensor detecting rotation speed indicative signal having a value indicative of the detected wheel speed;

a lateral force sensor for producing a lateral force indicative signal representative of a lateral force applied to a vehicle body;

a controller deriving a control signal for controlling operation of said pressure control valve to actuate the latter to one of said first, second and third position on the basis of said wheel speed indicative signal so as to control wheel speed in a given optimal relationship with vehicle speed, said controller deriving a wheel slippage based on said wheel speed and comparing derived wheel slippage with a given reference value said controller is operative to derive brake control parameters including a wheel acceleration and said wheel slippage and to derive the control signal according to a predetermined schedule in which:

said pressure control valve is actuated to said third position when the derived wheel deceleration is greater than a given deceleration threshold, in a hold mode of said controller;

said pressure control valve is actuated to said second position when the derived slip rate is greater than a given slip rate threshold, in a released mode of said controller;

said pressure control valve is actuated to said third position when said slip rate is less than said slip rate threshold, in a hold mode of said controller; and said pressure control valve is actuated to said first position when the derived wheel acceleration is greater than a given acceleration threshold, to said third position when the fluid pressure increased due to the pressure control valve being in said first position, reaches a given pressure slightly below the lock pressure, and to said first position after expiration of said given period, in an application mode of the controller, and said controller being further active to operate said pressure control valve to said second position when the derived wheel slippage is greater than said given reference value, and said controller being responsive to said lateral force indicative signal having a value exceeding a given threshold for decreasing said given reference value at a predetermined value.

7. An anti-skid brake control system as set forth in claim 6, wherein said lateral force sensor comprises a yaw rate sensor for monitoring magnitude of yawing motion of the vehicle and producing a yawing rate indicative signal serving as said lateral force indicative signal.

8. An anti-skid brake control system as set forth in claim 6, wherein said lateral force sensor comprises a steering angle sensor for monitoring steering angular variation and producing a steering angle indicative signal serving as said lateral force indicative signal.

9. An anti-skid brake control system as set forth in claim 8, wherein said lateral force sensor further includes a yaw rate sensor for monitoring magnitude of yawing motion of the vehicle and producing a yawing rate indicative signal serving as said lateral force indicative signal.

10. An anti-skid brake control system for an automotive vehicle comprising:

a hydraulic brake circuit for building up braking fluid pressure according to manual braking operation and distributing fluid pressure to at least one wheel cylinder;

a pressure control valve unit disposed within said hydraulic brake circuit for varying valve positions between a first position in which fluid pressure in the wheel cylinder is increased according to the increase in said braking pressure built up in said hydraulic brake circuit, and a second position in which said fluid pressure in said wheel cylinder is decreased;

a first sensor for producing a wheel speed indicative signal representative of a rotation speed of a vehicular wheel;

a second sensor for producing a lateral force indicative signal representative of a lateral force applied to a vehicle body;

a controller receiving said wheel speed indicative signal for deriving a control signal for operating said pressure control valve unit between said first and second positions, said controller deriving a wheel slippage based on said wheel speed and comparing derived wheel slippage with a given reference value, said controller activating said pressure control valve to said first position when the derived wheel acceleration is greater than a given acceleration threshold, to said third position when the fluid pressure is increased due to the pressure control valve being in said first position, reaches a given pressure slightly below the lock pressure, and to said first position after expiration of said given period, in an application mode of the controller, to operate said pressure valve to said second position when the derived wheel slippage is greater than said given reference value, said controller being further operable for deriving said given reference value on the basis of the magnitude of the lateral force exerted on the vehicle body for adjusting said given reference value depending upon the lateral force magnitude, said controller comparing said lateral force indicative signal value with a given threshold representative of a lateral force criterion and responsive to said lateral force indicative signal having a value greater than said given threshold for decreasing said given reference value.

* * * * *